March 25, 1969  W. C. KIRKPATRICK  3,434,588
PLASTIC CONTAINERS FOR PAINT
Filed Sept. 1, 1965

United States Patent Office 3,434,588
Patented Mar. 25, 1969

3,434,588
PLASTIC CONTAINERS FOR PAINT
Wylie C. Kirkpatrick, Moreland Hills, Ohio, assignor, by mesne assignments, to SCM Corporation, New York, N.Y., a corporation of New York
Filed Sept. 1, 1965, Ser. No. 484,405
Int. Cl. B65d 85/00
U.S. Cl. 206—46                    1 Claim

ABSTRACT OF THE DISCLOSURE

Improved paint (including enamel, varnish, and lacquer) container bodies and/or lids therefor made of polymers such as polyolefins or polystyrene are presented. Formation of undesirable flakes in the liquid paint has been traced to the normally weak adhesion of adventitious dried paint deposits to the polymer surface. This flaking is reduced by making the interior surface of said container body and/or lid more strongly adherent to such dried paint deposits.

---

This case relates to containers for liquid paint and the like, produced from polymeric resinous material and, more particularly, to such containers having a specially treated surface, such as a roughened surface finish for enhanced adhesion of dried paint to such surface.

Paint containers and closures manufactured from polymeric resinous materials, for example, polyethylene, are readily and economically produced and are light-weight. However, the containers and closures prepared from such materials exhibit the troublesome problem of decreased to almost negligible surface adhesion for dried paint. On certain surface areas, such as the underside of container covers and the inside container surfaces exposed above the liquid paint level, this decreased adhesion can be particularly deleterious. Liquid paint splashes and coats these surfaces, as during shipment of the paint or mixing of the paint in the container. Often, before the paint is initially used or reused after partial application, this surface coating dries. Removal of the cover, or subsequent simple mixing of the liquid paint, for example by stirring with a wooden paddle, can lead to chipping, flaking, and peeling of the dry paint and resultant deposition of flakes, etc., into the liquid paint. Generally these flakes are substantially unaltered by conventional mixing techniques and thus usually brush out on application of the paint as unattractive specks and lumps.

My container for liquid paint and the like and cover therefor are composed of polymeric resinous material and have, respectively, an inside surface and an underside surface wherein an appreciable area of at least one of these surfaces is specially treated to increase the adherence of dried paint and the like to such surface. In treating the surface of the polymeric material to prepare the special finish, one or more of the following preparations are employed; mechanical roughening, chemical roughening, flame treating, electrical discharge treating, or the application of an overlying liner.

Figure 1:
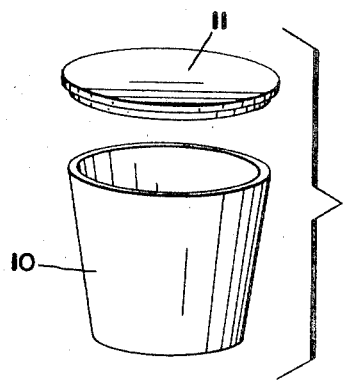
Figure 2:
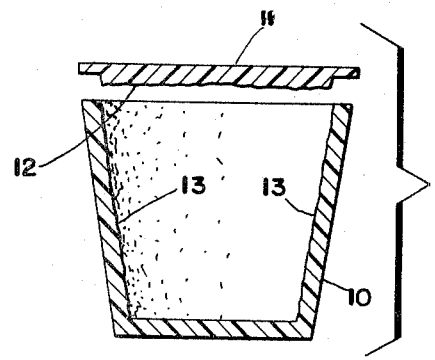

In the drawing:
FIGURE 1 is a perspective view showing a typical plastic container for paint and the like and a cover therefor;
FIGURE 2 is a vertical, sectional view of the paint container and cover of FIGURE 1 showing a specially treated finish on the interior of the container and the underside of the cover; and
FIGURES 3 through FIGURE 7 are fragmentary sections of the wall of the container or cover of FIGURE 2, each fragmentary section having a specially treated finish prepared by a different technique.

Referring more particularly to the drawing, FIGURE 1 shows an exemplary container 10 for paint and the like and a cover 11 for each container. FIGURE 2 shows that the container 10 of FIGURE 1 is produced from polymeric resinous material, and the container cover 11 is likewise produced from polymeric resinous material. The undersurface of the cover 11 has a mechanically roughened, textured finish 12 and the substantially vertical wall portions of the container 10 also have a mechanically roughened, textured finish 13.

Figure 3:
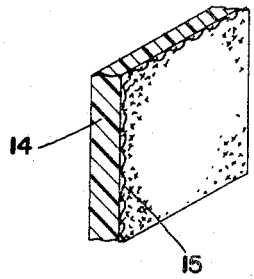
Figure 4:
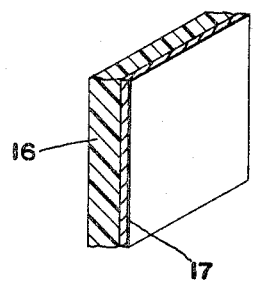
Figure 5:
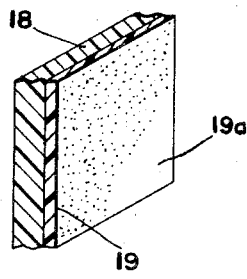
Figure 6:
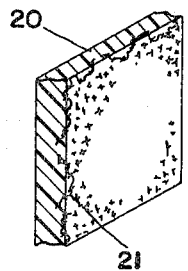
Figure 7:
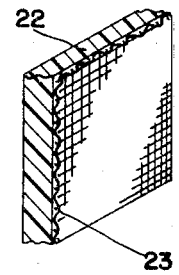

In FIGURE 3, the polymeric material portion 14 has a woven fiber lined finish 15. The polymeric section 16 of FIGURE 4 has a metallic lining 17 which supplies the roughened finish, and in FIGURE 5 such finish is provided on the section 18 by a filled resinous intermediate layer 19, which finish can also be free from filler as depicted in FIGURE 5 by the 19a portion of the finish. FIGURE 6 shows a flock or woven fiber finish 21 which provides the roughened, textured finish to the polymeric section 20 from a partially embedded position in the polymeric section 20. A metallic screen lining 23 provides a roughened surface to the section 22 of FIGURE 7. These structures are hereinafter more fully described.

Additional finishes included in my invention but which do not lend themselves to depiction in the drawing are a chemically treated surface, a flame-treated surface, and an electrical discharge treated surface.

By the use of the term "paint and the like," I mean to include paints, enamels, varnishes, and lacquers. Such paint can contain pigment in a binder or be unpigmented, as for example cellulose lacquers, and the paint can be solvent reduced, e.g., polyester or polyurethane paint, or water reduced, as are the latex and water soluble alkyds. Other paints which I means to include are oil paints and oil-wax-type coatings.

By using the expression "dried paint" or "paint in dried form," I mean paint which has been deposited in liquid form on a container surface, e.g., the underside surface of a container cover, and thereafter dried, i.e., sufficiently cured to exhibit substantial film formation so that upon removal of the paint from the container surface, as by wiping the surface with a cloth, or repeatedly shaking the container for a few seconds to agitate the contents and provide contact between liquid and dried paint, such dried paint will be removed as flakes, or chips or in peeled form.

Paint containers made from polymeric resinous material can have conventional shape, i.e., the cylindrical canister or "can" shape, but by the use of the term "container" I also mean to include pails (with or without handles), buckets, tubes, drums, and other like forms of containers. Covers can be various shapes, such as the conventional tongue-and-groove, pressure-fitted closures, snap type caps and lids, threaded closures and sliding covers and the like. I mean to use the terms "cover," "lid," and "closure" herein interchangeably. In aerosol type containers the closure is more appropriately a valve. However, by these quoted terms, I specifically mean to include the use of valve closures and the like for aerosol containers.

The container can be produced from a different polymeric resinous material than the material used to produce the cover. For example, to readily withstand normal, and even rough, jostling during handling, the container can be manufactured from a relatively rigid material such as polystyrene and particularly high-impact polystyrene. The lid for such a container can then be formed from a relatively more flexible material such as polyethylene. This type of flexible lid often facilitates replacing of the lid on the container after partial use of the paint. Also where a rigid, substantially opaque, material is used for the container a somewhat transparent or translucent material can be used as a cover and thus permit inspection of the paint without removal of the lid.

Polymeric resinous material which can be used in making the container and/or cover for such container include various catalyst activated materials such as polyesters and epoxies, thermosetting materials such as urea-formaldehyde and melamines as well as thermoplastic resins such as the cellulosics including cellulose acetate, polyamides, acrylics, polycarbonates and polymerized vinyl monomers such as polyvinyl chloride, vinyl chloride/vinyl acetate copolymers and the like, and furthermore, such materials as neoprene, nitrile butadiene rubber, and acrylonitrile-butadiene-styrene rubber. However, the preferred materials are the polyolefins, including halogenated polyolefins, for example, polyethylene, polytetrafluoroethylene, polypropylene, as well as their copolymers, ethylene-propylene terpolymer, other derivatives such as chlorosulfonated polyethylene, and copolymers with other monomeric substances including those which contain a vinyl unit.

The mechanism by which paint adheres to various materials is not wholly understood, but is believed to be a physical bonding accompanied by varying degrees of chemical bonding, the degree depending on the material being painted. Other phenomenon such as electrostatics may also be involved. However, I do not mean to be bound by any particular theory involving the adherence of dried paint to a substrate.

One of the roughened, textured surfaces for increasing the adherence of dried paint comprises mechanically roughened polymeric resinous material such as produced by abrasive finishing, or gouging such surface with a tool. Additionally a mechanically produced rough finish can be obtained by developing a pattern on the material surface, as in pattern molding. To avoid an extensively untextured surface that could produce only an unappreciable increase in dried paint retention, it is preferable, particularly for pattern development or in roughening with a tool, to maintain adjacent ridges, or grooves, or like surface irregularities, in close spatial relationship. Thus I prefer that such adjacent grooves, etc., not be separated by a greater distance than about ⅛ of an inch, to enhance adherence of dried paint on the roughened finish.

A roughened, textured finish can also be obtained by fiber liners overlying the polymeric resinous material surface. Suitable fiber liners can be woven or webbed material, for example, cloth fabric, or the finish can be a matted or felted fibrous surface, as for example paper and the like. The fiber liners can be simply draped over substantially vertical container wall areas, or the fabric liner can be loosely fitted and held in place or stretched and held in place by conventional mechanical fastening means, as well as adhesives, e.g., a pressure-sensitive adhesive of the butadiene-styrene-resin type, optionally modified with rosin and/or petroleum resins and thinned with aliphatic hydrocarbons. These adhesives are either not affected by paint components, or are used to secure the fabric by placement above the liquid paint level for intermittent to negligible contact, or freedom from contact, by liquid paint. Furthermore, woven fabric or flocks can be partially embedded in the polymeric resinous material for intermittent exposure at the surface regions of the container where paint adherence is to be increased.

Additional lining material to provide a roughened, textured finish can be metallic in nature, that is, elemental metal liners, alloy liners, and liners of these types having a chemically modified, for example, oxidized, surface such as the normal oxidized surface formed by metallic aluminum. These liners are suitably foil, but they can be of greater thickness than conventional metal foil and in either case have corrugations and other surface irregularities. Liners of the metallic type can be screens or have a grid-type structure which can be irregular in nature, i.e., the grid can be metallic filaments in matted form. As with fabric liners, metallic liners can be partially embedded in the polymeric resinous material or can be bonded to such material by any of the known techniques for bonding metal and polymeric substances, for example, adhesive bonding. In some instances, that is, the use of an aluminum liner in conjunction with a latex paint, it is necessary that the paint contain pacifying agents which prevent reaction between the liner and the body of the paint, as will be well recognized by persons skilled in the paint container art.

Another roughened, textured finish which I can use is a filled or filler-free resinous lining overlying the polymeric resinous material surface such as one provided by a filled "flat finish." These flat finishes without filling are usually clear, and can be somewhat glossy, but can be alternatively pigmented. Usually they comprise polyvinyl material including polymerized vinyl/vinylidene copolymers, as well as phenolic, epoxy, and phenolic-epoxy material. Fillers for such finishes include sand, whitings, barytes, talc, mica, aluminum silicates, and like substances which are substantially inert to paint. Additional filled and unfilled resinous finishes include rosin, pitch and their mixtures. However, rosin can be sensitive to the alkali conditions often present in latex paints and thus, for use with such paints, resinous materials such as ester gum, are desirable. It has been found operable to enhance dried paint adhesion or particularly non-adherent surfaces, such as polyolefinic resinous surfaces, by using non-olefinic resins such as polyesters or the above-mentioned resinous overlying linings in unfilled form. However, because of the resinous nature of such overlying linings, I prefer to use a roughened, textured finish as described herein in place of such filter-free resinous overlying linings.

Another roughened, textured finish for retarding dried paint flaking is a polymeric resinous material surface modified by electrical discharge, particularly a directional corona discharge. Devices that produce this type of finish, which is not visible to the naked eye but can be observed through increased dried paint adhesion, commonly comprise Tesla-type coils which often employ vacuum tubes as high frequency oscillators and resonant coils tuned to about 500,000 cycles per second.

Another roughened, textured finish is a polymeric resinous material surface prepared by flame-treating such surface. This roughness, although generally not as pronounced as that produced by mechanical abrasion, can usually be visually detected by a decrease in the glossiness of treated material. In flame-treating the polymeric resinous material I prefer to use a soot-free flame such as that produced by burning lower paraffinic hydrocarbons with an excess of air. This avoids deposition on the material of any objectionable fine or gritty particles and the like which would require a separte removal step, or otherwise contaiminate the paint. Contact times for flame treatment of a fraction of a second generally insure against scorching the polymeric resinous material, or melting in the case of thermoplastic material, even at flame temperatures of 5000° F. or more.

An additional roughened, textured finish is one provided by chemically treating the surface of the polymeric resinous material. This type of finish can be achieved by controlled contact between the material and a solvent or solvent combination for such material to remove a portion of the polymeric resinous material at its surface, e.g., partially etch and thus texture the material surface. Solvents which I can use to dissolve fractions of the material are hydrocarbon type solvents such as benzene, xylene, and n-hexane as well as further organic solvents such as ethyl acetate. Other substances for providing a chemically roughened surface, which can be used alone or in combination with the solvents, are oxidizing agents such as ozone, sodium or potassium permaganate, concentrated nitric acid, and mixtures which includes ozone with nitrous oxide and sodium dichromate with sulfuric acid.

The following example shows a way in which my invention has been practiced, but should not be construed as limiting the invention.

*Example*

Twelve canisters, each having a polyethylene snap-fit cover, were selected for testing with a commercial latex paint. All covers had a substantially flat underside surface and a substantially flat upperside surface and additionally had a depending member around the rim of the cover for snap engagement with the canister. Three covers were retained for controls and the remaining covers were divided into three groups of three each.

The first group of three polyethylene covers were manually sanded on their substantially flat underside surface for about one-half minute with a medium grade, number 80(0) (industrial grit grade) of commercial sandpaper. Another group of covers (or lids) were individually lined on their underside surfaces with a commercially available household type of aluminum foil of three mils thickness. The remaining three lids were individually lined on their underside surfaces with swatches of woven, cotton-fabric bedsheet. The foil and cloth liners were each held in place with a commercial pressure-sensitive adhesive of finely-divided rubber particles dispersed in a hydrocarbon medium. This adhesive was completely unaffected by the latex paint during the following test.

All canisters were then filled with the commercial latex paint and the covers snapped on the canisters. The vapor space between the liquid level of the paint in the canisters and the underside surface of the lids averaged about a quarter of an inch for all canisters. Each canister was then shaken by hand to thoroughly coat the underside lid surface with the latex paint, and all were subsequently stored for 60 days.

At the end of the 60 days the canisters were removed from storage, again shaken to assure good contact of paint with the underside surface of the lids, and the lids removed. On the three lid underside surfaces of the controls, the initial coating of paint had dried, flaked, partially peeled and come loose in the body of the paint. On the three lids having the roughened underside surface as well as those having overlying aluminum and cloth liners the similar dry paint coatings showed substantially increased retention to each underside lid surface and lining, i.e., negligible to no paint flaking of the dried paint and only slight initial peeling. Thus, the dried paint adhesion for the nine treated lids was observed to be substantially greater than the adhesion for the control lids under turbulent liquid paint action.

Additionally each lid was held in the hand and, using moderate pressure, each underside surface was manually rubbed with a cotton, household terry cloth towel. Upon visual inspection of each lid after this rubbing, removal of dried paint was observed from only the control lids, which further demonstrated the enhanced paint retention obtained with the roughened, as well as with the lined, lids.

The foregoing example demonstrates the application of this invention to polyemeric resinous material to overcome the problem whereby flaking of dried paint from a paint container surface composed of such material can produce resultant, deleterious deposition of dried flakes into the liquid paint within the container.

What is claimed is:

1. A container and its contents comprising a container body and lid, said contents consisting essentially of liquid paint, the interiors of said body and lid in contact with said liquid paint and resulting in the deposit of dried paint thereon, said container being formed of a polymeric resinous material having almost negligible adhesion for dried paint; the improvement which comprises: said interior surface having a roughened finish to increase the adhesion of said dried paint deposit sufficiently to reduce the likelihood of flaking off of said paint deposit from said interior surface into said liquid paint.

References Cited

UNITED STATES PATENTS

| | | | |
|---|---|---|---|
| 2,717,619 | 9/1955 | Whitman | 220 |
| 2,973,293 | 2/1961 | Schafield | 150 |
| 3,184,524 | 5/1965 | Whiteford | 220 |
| 3,189,242 | 6/1965 | Orr. | |
| 3,252,844 | 5/1966 | Hechelhammer | 156—2 |
| 3,255,060 | 6/1966 | Neumann | 156—2 |

GEORGE E. LOWRANCE, *Primary Examiner.*

U.S. Cl. X.R.

156—2; 220—63, 83